United States Patent [19]

Slater

[11] Patent Number: 4,861,048
[45] Date of Patent: Aug. 29, 1989

[54] JAW ASSEMBLY FOR LATHE CHUCK

[75] Inventor: Paul S. Slater, Derbyshire, England

[73] Assignee: Indexible Soft Jaws Limited, Derbyshire, England

[21] Appl. No.: 155,902

[22] Filed: Feb. 16, 1988

[30] Foreign Application Priority Data

Feb. 20, 1987 [GB] United Kingdom ................. 8703967

[51] Int. Cl.$^4$ ............................................. B23B 31/10
[52] U.S. Cl. ..................................... 279/123; 279/15 J
[58] Field of Search ......................... 279/15 J, 110, 123

[56] References Cited

U.S. PATENT DOCUMENTS

| 1,261,265 | 4/1918 | Miller | 279/123 |
|---|---|---|---|
| 2,896,958 | 7/1959 | Straus | 279/123 |
| 2,950,117 | 8/1960 | Walmsdey | 279/123 |
| 3,179,430 | 4/1965 | Zierden | 279/123 |
| 4,029,325 | 6/1977 | Rohm | 279/123 |

FOREIGN PATENT DOCUMENTS

| 2813832 | 10/1979 | Fed. Rep. of Germany . | |
|---|---|---|---|
| 1098257 | 7/1955 | France | 279/15 J |
| 1152665 | 2/1958 | France | 279/123 |
| 2040517 | 1/1971 | France . | |
| 148383 | 7/1920 | United Kingdom | 279/123 |
| 2110124A | 6/1983 | United Kingdom . | |
| 2143163A | 2/1985 | United Kingdom . | |
| 2192145 | 1/1988 | United Kingdom . | |

Primary Examiner—Gil Weidenfeld
Assistant Examiner—Daniel W. Howell
Attorney, Agent, or Firm—Killworth, Gottman, Hagan & Schaeff

[57] ABSTRACT

A lathe chuck includes three jaws each comprising a reciprocating jaw member to which an indexible, hexagonal, soft metal clamping member is detachably secured. Each jaw member has a raised portion which engages in a recess in the underside of the clamping member. Each jaw mwmber also has an upright pin located at a leading edge of the jaw member, which engages in one of six slots formed in the peripheral surfaces of the recess and each aligned with a respective corner of the clamping member, thereby providing correct indexing of the clamping member.

In another embodiment of the invention, two oppositely-facing leading edges are provided, so that they can be used for clamping against the inner surface of a tube or the outer surface of a bar, respectively.

19 Claims, 5 Drawing Sheets

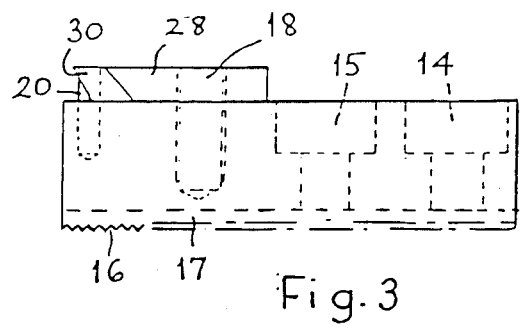
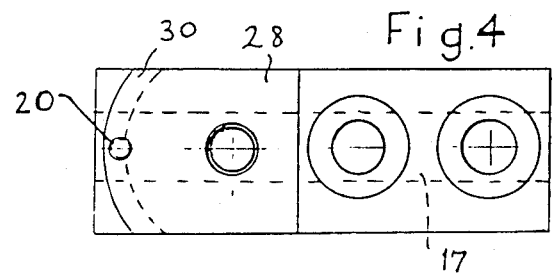
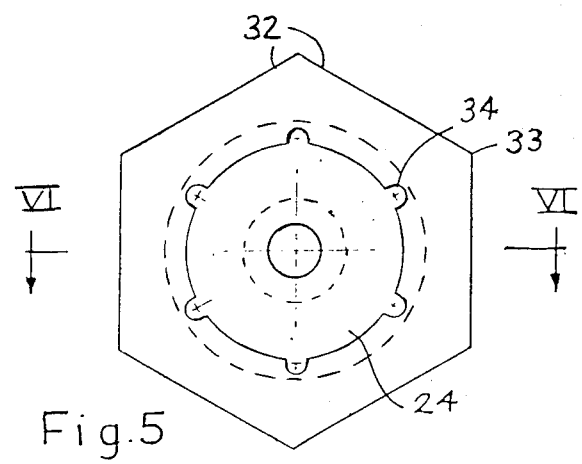
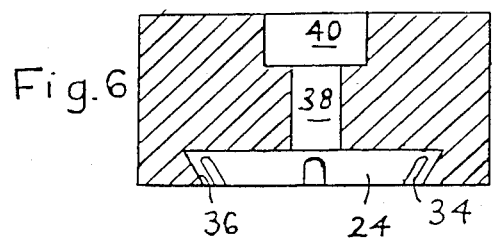

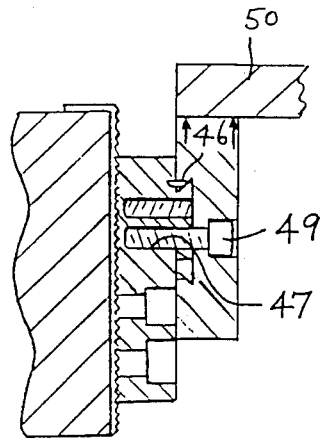
Fig.10a
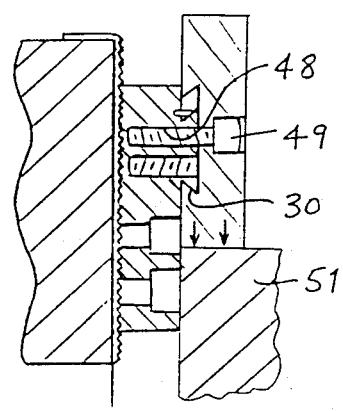
Fig.10b
Fig.10c
Fig.10d
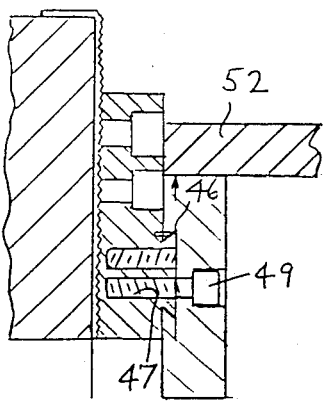
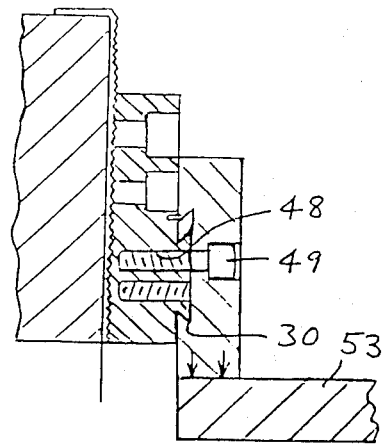

JAW ASSEMBLY FOR LATHE CHUCK

FIELD OF THE INVENTION

The invention relates to a jaw assembly for a lathe chuck of the "soft jaw" type.

BACKGROUND OF THE INVENTION

A soft jaw lathe chuck generally comprises a plurality of jaw members movable reciprocally towards and away from a central point coinciding with the lathe axis. Each of the jaws includes a clamping member of relatively soft metal which can be drilled or otherwise machined to form an aperture of the desired size and shape to accommodate a particular type of workpiece. A typical arrangement comprises three reciprocally movable jaw members arranged at 120° intervals around the axis and movable on threaded shafts or the like towards and away from the axis in directions perpendicular to the axis. On each of the jaw members is mounted an indexible hexagonal clamping member, these clamping members being so aligned that respective corners of each of them coincide on the lathe axis when the jaw members are moved inwards to the fullest extent. A hole can then be machined, along the lathe axis and centered on the meeting point of the three corners.

To enable a plurality of workpieces of different size and shape to be accommodated by a single assembly of jaws and clamping members, the clamping members are generally made symmetrical and indexible. In this way, up to six different sizes or shapes of workpiece can be accommodated by indexing each of the clamping members through 60° at a time.

It's obviously important that the clamping members must be held securely in place during both the formation of the jaw aperture and during turning of a workpiece held in the jaw. To ensure this, clamping members which have been used hitherto are fastened to the jaw member by means of a central clamping screw and furthermore have a shallow recess on their undersides tapering inwardly towards the bottom surface of the insert to engage correspondingly shaped forward projection on the jaw member to which the clamping member is secured. This helps to prevent the clamping member from lifting under stress, but there remains the problem of accurate indexing of the clamping member and securing it in such a way that it will not twist laterally out of line during machining of the jaw aperture or during turning.

One arrangement which has been used hitherto for indexing the clamping members has been the provision of a longitudinal tenon on the upper surface of the jaw member to which the clamping member is attached, engaging a corresponding slot within the recess on the underside of the clamping member. The accurate machining on the underside of the clamping member first of a recess with inwardly tapering surfaces and then of three (in the case of a hexagonal clamping member) transversely extending slots in the inner surface of the recess is a difficult operation, and even if it can be done accurately the indexing of the clamping member is a complicated operation. The present invention aims to provide a simplified indexing and clamping arrangement which is easy to machine and easy to use.

SUMMARY OF THE INVENTION

The present invention provides a clamping jaw for a lathe chuck comprising a jaw member adapted to be mounted in a chuck for reciprocal longitudinal movement and an indexible polygonal clamping member detachably secured to a leading edge of the jaw member, wherein for the purpose of indexing an upright projection is provided extending upwardly from an upper surface of the jaw member to engage the clamping member and wherein a recess is formed on the underside of the clamping member with a plurality of slots formed in the peripheral surface of the recess, each of said slots being positioned to engage the projection in one working position of the clamping member.

With the arrangement of the invention, the clamping member can be indexed simply by removing the clamping screw which secures it to the jaw member and rotating it until the projection engages another slot corresponding to the desired new position of the clamping member.

DESCRIPTION OF THE DRAWINGS

Preferred embodiments of the invention will now be described with reference to the accompanying drawings wherein:

FIG. 3 is a side elevation of one of the jaw members shown in FIGS. 1 and 2, with internal parts shown in broken lines;

FIG. 4 is a plan view of the jaw member shown in FIG. 3;

FIG. 5 is a plan view of the underside of one of the clamping members shown in FIGS. 1 and 2;

FIG. 6 is a cross-section on the line VI—VI in FIG. 5,

DETAILED DESCRIPTION OF THE INVENTION

Figure 1:
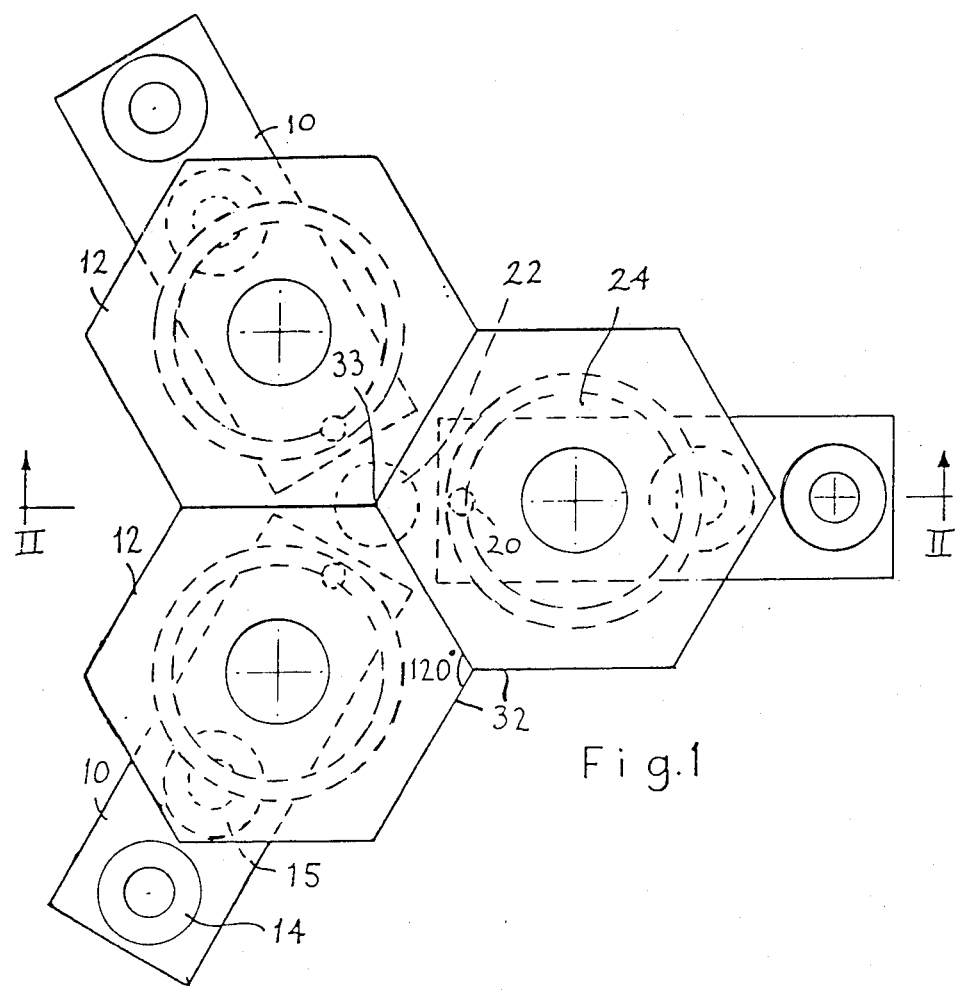
FIG. 1 shows in plan view how three clamping jaws according to one embodiment of the present invention engage when mounted in a lathe chuck, prior to drilling of a clamping aperture.
Figure 2:
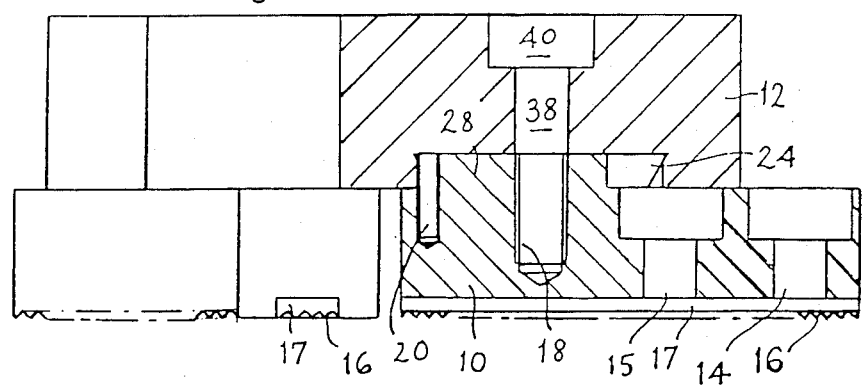
FIG. 2 is a cross-sectional view on the line II—II of FIG. 1.

Referring first to FIG. 1, three jaws of a lathe chuck are shown in their innermost position, prior to the boring of a chuck aperture. Each of the jaws comprises a reciprocating jaw member 10 which, as can be seen in FIG. 2, has a channel 17 to engage a corresponding ridge of the chuck mounting and serrated or toothed surfaces 16 on either side of the channel which engage with corresponding teeth or serrations on the chuck mounting to secure the jaw member rigidly for movement on the chuck mounting towards and away from the axis of rotation of the chuck. Holes 14,15 are provided for clamping screw (not shown) to secure the jaw member in position.

To the top surface of each of the jaw members 10 is secured a soft metal clamping member 12, suitably of a relatively soft steel such as EN-8, which in plan view has a regular hexagonal shape. Each of these clamping members thus has six side surfaces 32 with angles of 120° between them, whereby the three clamping members when correctly indexed can meet at respective corners 33 thereof precisely on the axis of rotation of the chuck. A chuck aperture such as 22, shown in broken lines can then be machined.

To form further chuck apertures, each of the clamping members 12 is indexed through an angle which will be a multiple of 60°, so that a different corner is at the center. A chuck aperture of different size or shape can then be machined.

As can be seen in FIG. 2,3 and 4, each of the jaw members 10 has a raised portion 28 which engages in a corresponding recess 24 in the underside of the clamping member 12. As can be seen in FIGS. 5 and 6, the recess 24 is circular in shape and has a peripheral surface 36 which tapers inwardly towards the bottom of the clamping member to produce a standing surface. The leading edge 30 of the raised portion 28 on the jaw member 10 is arcuate and of the same radius as the recess in the clamping member 12. It is also cut to an angle to provide a slanting surface to match the slanting peripheral surface of the recess 24 so that the clamping member is held against upward movement.

Each of the clamping members 12 is secured to its respective jaw member 10 by means of a clamping screw (not shown) which passes through a central aperture 38 of the clamping member and into a threaded bore 18 in the jaw member. The central aperture 38 has a widened upper portion 40 to accommodate the head of the clamping screw.

To ensure correct indexing of the clamping member 12, an upright pin 20 is provided in a bore at the leading end of the jaw member 10. The upper end of the pin is flush with the top of the raised portion 28 and just behind the foremost periphery of this portion. Because of the inward slope of the forward edge 30, the cylindrical surface of the pin 20 is partly exposed at the front.

Each of the clamping members 12 has, around the periphery of the recess 24, six indexing slots 34 each of which is aligned with a respective corner 33. The clamping member is correctly indexed when the pin 20 engages in the slot 34 corresponding to the corner 33 which it is desired to use.

In order to index the clamping members 12 from the position shown in FIG. 1, the jaws are first retracted away from the fully forward position shown in FIG. 1. Each of the clamping members is then indexed simply by removing the clamping screw which holds it in position, moving it slightly forward so that the pin 20 disengages from its slot 34 and rotating the clamping member in the desired direction through 60°, 120° or 180° until the desired corner is pointing forwards. The clamping member is then moved slightly backwards to engage the pin 20 in its new slot 34 and to bring the bores 18, 38 back into alignment and the clamping screw is again tightened. When the three jaws are moved back to their fully forward position, each of the clamping members will be bearing against the others in such a way as to push them rearwardly, in each case engaging the pin 20 firmly in its slot 34 and causing the tapered surfaces 30, 36 to interengage in such a way that the clamping member is held firmly against any upward pivoting movement when a new jaw aperture is drilled.

Figure 7A:
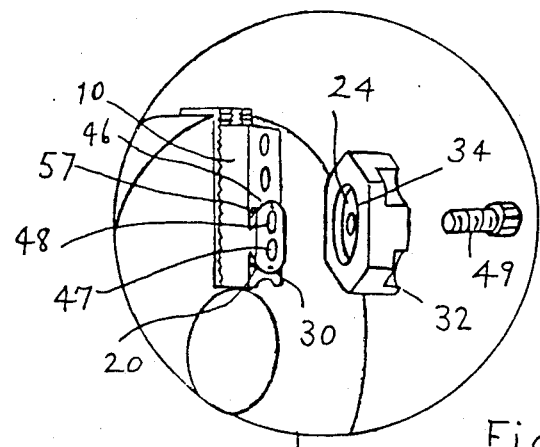
FIG. 7a is an enlarged view of part of the arrangement shown in FIG. 7.
Figure 7:
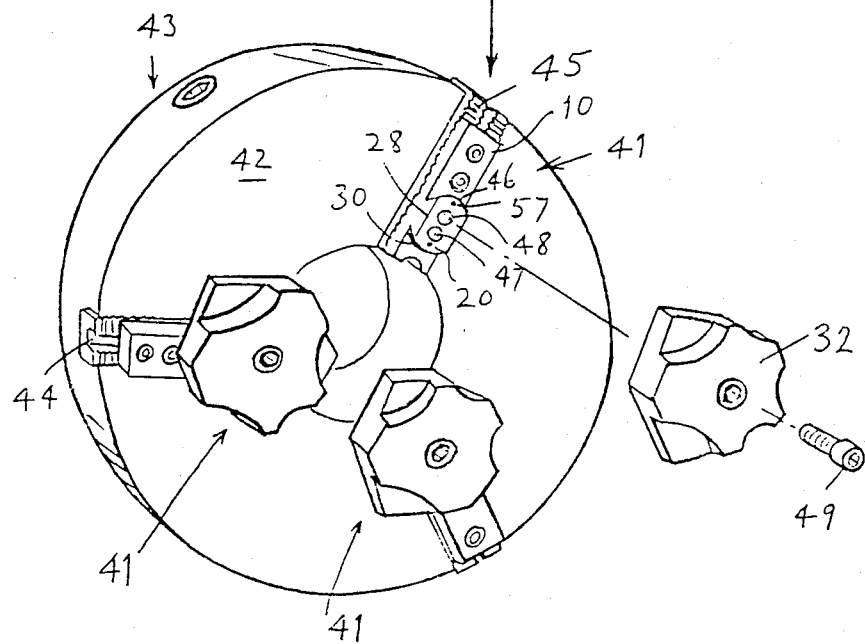
FIG. 7 is a schematic perspective view of three clamping jaws, according to a second embodiment of the present invention, mounted to form a lathe chuck.
Figure 8:
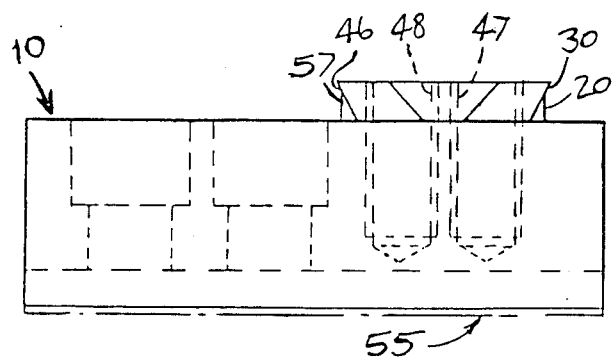
FIG. 8 is a side elevation of one of the jaw members shown in FIGS. 7 and 7a, FIG. 9 is an end elevation of the jaw member shown in FIG. 8, FIGS. 10a to 10d are schematic sectional views of one of the jaw members shown in FIGS. 7 to 9 illustrating how the embodiment can be used.
Figure 9:
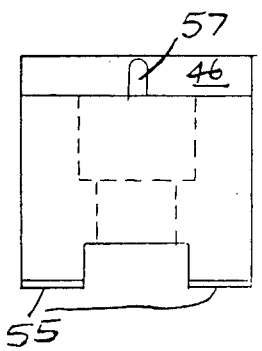

FIGS. 7 to 10 show another embodiment of the present invention, wherein like parts are labelled with like reference numerals with respect to FIGS. 1 to 6. Referring now to FIGS. 7 to 9, three jaws 41 are mounted at equiangular spacings around the rotational axis of the chuck on a face 42 of an annular support 43. The underside of each jaw member 10 is provided with a ridge which engages in a corresponding channel 44 provided in the support face. Complementary interengaging serrations 45 are also provided respectively on the support face and the underside of the jaw member, such that each jaw can be moved in a reciprocating manner in a radial direction relative to the chuck. The raised portion 28 of the jaw member has a second arcuate slanting surface 46, in addition to, and located facing in the opposite direction to, the arcuate slanting surface 30. The longitudinal vertical cross-section of the raised portion is thus dove-tail shaped. This second surface is also provided with another upright pin 57 of same construction as the pin 20. The raised portion 28 also has two threaded bores 47, 48 each located adjacent a respective one of the surfaces 30, 46 and clamping screw 49 screws into either one of the bores to secure the clamping member to the jaw member, depending on which pin 20, 57 one of the slots 34 is intended to engage with.

In this manner, either one of the two arcuate surfaces 30, 46 can act as a leading edge, to which the clamping member is secured. The chuck can thus be used to clamp the inner surface of a cylindrical object, such as a holow tube, by using the surface 46, which faces the inner surface to be clamped, as the leading edge, or it can be used to clamp the outer surface of a cylindrical object, such as a bar by using the arcuate surface 30, which faces the outer surface to be clamped, as the leading edge. In either case, the clamping screw is screwed into the bore 47 or 48, which is further from the leading edge being used.

These different clamping actions are shown schematically in FIGS. 10a to 10d, which each show the clamping action of one of the jaws 41. In FIG. 10a, the jaw is clamped against the inner surface of a large diameter tube, shown partly at 50, with the arcuate surface 46 of the jaw member acting as the leading edge and the clamping screw 49 being screwed into bore 47. FIG. 10b shows the jaw clamped against the outer surface of a large diameter bar, shown partly at 51, with arcuate surface 20 acting as the leading edge and the clamping screw 49 being screwed into the bore 48. In FIG. 10c, the jaw is clamped against the inner surface of a medium diameter tube, shown partly at 52, in the same manner as FIG. 10a, except that the jaw member 10 has been turned through 180° relative to the chuck face, and FIG. 10d shows the jaw clamped against the outer surface of a small diameter bar, shown partly at 53, in the same manner as FIG. 10b but again with the jaw member turned through 180°.

Figure 11:
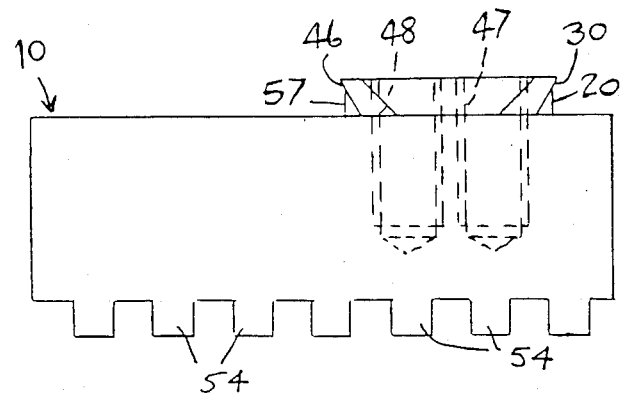
FIG. 11 is a side elevation of a jaw member according to a third embodiment of the invention.
Figure 12:
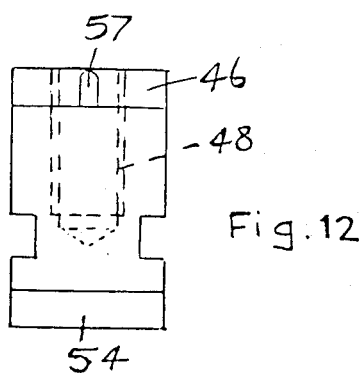
FIG. 12 is an end elevation of the jaw member shown in FIG. 10.

FIGS. 11 and 12 show a third embodiment of the jaw member 10, the underside of which is formed with ridges 54 in the shape of castellations, instead of the serrations 55 of the embodiment shown in FIGS. 7 to 10. The ridges 54 are intended to engage in corresponding channels formed in the chuck face 42. The holes 14, 15, in the jaw member shown in FIGS. 1 to 10 have also been omitted in the embodiment shown in FIGS. 11 and 12.

The arrangement of the present invention is both simpler to produce and simpler to use than arrangements known previously, and it still enables the clamping members to be precisely indexed and to be held fast against any movement during the machining of an aperture or the turning of a workpiece. Furthermore, the arrangement of the present invention can be used to clamp either the outer or inner surface of a cylindrical object.

I claim:

1. A clamping jaw for a lathe chuck, comprising a jaw member having at least one leading edge, and adapted to be mounted in a chuck for reciprocal longitudinal movement an an indexible polygonal clamping member detachably secured to a leading edge of the jaw member, wherein, for the purpose of indexing, an upright projection is provided extending upwardly from an upper surface of the jaw member to engage the clamping member and wherein a recess having a peripheral surface is formed on the underside of the clamping member with a plurality of slots formed in the peripheral surface of the recess, each of said slots being positioned to engage the projection in one working position of the clamping member.

2. A clamping jaw as claimed in claim 1, wherein said jaw member is provided with two oppositely-facing leading edges and the clamping member is secured to the leading edge which faces a surface of an object intended to be clamped.

3. A clamping jaw as claimed in claim 1, wherein said clamping member is detachably secured to said jaw member by a screw which is screwed into threaded coincident bores respectively formed in said clamping member and jaw member.

4. A clamping jaw as claimed in claim 3, wherein said jaw member is formed with two bores, each being located adjacent a respective one of said leading edges, and said screw is located in the bore further from the leading edge to which the clamping member is secured.

5. A clamping jaw as claimed in claim 1, wherein the or each leading edge of said jaw member is formed by a side face of a raised portion of said jaw member extending upwardly from said upper surface, said side face being shaped to engage with said peripheral surface.

6. A clamping jaw as claimed in claim 5, wherein said side face and said peripheral surface are respectively provided with complementary interengagable slanting surfaces to hold said clamping member against movement away from said jaw member.

7. A clamping jaw as claimed in claim 6, wherein said upright projection is a pin located in a bore formed in said raised portion at said leading edge, such that the cylindrical surface of said pin is partially exposed by said slanting surface of said side face.

8. A clamping jaw as claimed in claim 1, wherein the shape of said clamping member is a regular polygon and each of said slots is aligned with a respective corner of said polygon.

9. A chuck for a lathe comprising a plurality of clamping jaws arranged at equiangular interval saround a rotational axis of the chuck, each of said clamping jaws comprising a jaw member adapted to be mounted in the chuck for reciprocal longitudinal movement and an indexible polygonal clamping member detachably secured to a leading edge of the jaw member, wherein, for the purpose of indexing, an upright projection is provided extending upwardly from an upper surface of the jaw member to engage the clamping member and wherein a recess is formed on the underside of the clamping member with a plurality of slots formed in the peripheral surface of the recess, each of said slots being positioned to engage the projection in one working position of the clamping member.

10. A chuck as claimed in claim 9, wherein said jaws are mounted on, and movable relative to, a face of a support member, said jaw members and said support face being provided with complementary interengaging formations.

11. A clamping jaw for a lathe chuck comprising:
a jaw member adapted to be mounted in the chuck for reciprocal longitudinal movement, said jaw member being provided with two oppositely-facing leading edges and being formed with two threaded bores, each being located adjacent a respective one of said leading edges, and
an indexible polygonal clamping member adapted to be detachably secured to whichever one of said leading edges faces towards a surface of an object to be clamped by a screw located in whichever one of said bores is further from the leading edge to which the clamping member is to be secured,
such that said clamping member is capable of selectively clamping against an inner or outer surface of an object.

12. A clamping jaw as claimed in claim 11, wherein said jaw member is provided with a raised portion and said leading edges are formed respectively on two oppositely-facing side faces of said raised portion, and said clamping member is provided with a recess having a peripheral surface, each of said side faces being shaped to engage with said peripheral surface.

13. A clamping jaw as claimed in claim 12, wherein said side faces slant in opposite directions and said peripheral surface is provided with a complementary interengagable slanting surface to hold said clamping member, when secured to either one of said leading edges, against movement away from said jaw member.

14. A chuck for a lathe, comprising a plurality of clamping jaws arranged at equiangular intervals around a rotational axis of the chuck, each of said clamping jaws comprising a jaw member adapted to be mounted in the chuck for reciprocal longitudinal movement, said jaw member being provided with two oppositely-facing leading edges and being formed with two threaded bores, each being located adjacent a respective one of said leading edges, and
an indexible polygonal clamping member adapted to be detachably secured to whichever one of said leading edges faces towards a surface of an object to be clamped by a screw located in whichever one of said bores is further from the leading edge to which the clamping member is to be secured,
such that said clamping member is capable of selectively clamping against an inner or outer surface of an object.

15. A chuck as claimed in claim 14, wherein, in each clamping jaw, said jaw member is provided with a raised portion and said leading edges are formed respectively by two oppositely-facing side faces of said raised portion, and said clamping member is provided with a recess having a peripheral surface, each of said side faces being shaped to engage with said peripheral surface.

16. A chuck as claimed in claim 15, wherein said side faces slant in opposite directions and said peripheral surface is provided with a complementary interengagable slanting surface to hold said clamping member, when secured to either one of said leading edges, against movement away from said jaw member.

17. A clamping jaw as claimed in claim 2, wherein said clamping member is deattachably secured to said jaw member by a screw which is screwed into threaded coincident bores respectively formed in said clamping member and jaw member.

18. A clamping jaw as claimed in claim 3, wherein said jaw member is formed with two bores, each being located adjacent a respective one of said leading edges, and said screw is located in the bore further from the leading edge to which the clamping member is secured.

19. A clamping jaw as claimed in claim 2, wherein the or each leading edge of said jaw member is formed by a side face of a raised portion of said jaw member extending upwardly from said upper surface, said side face being shaped to engage with said peripheral surface.

* * * * *

UNITED STATES PATENT AND TRADEMARK OFFICE
CERTIFICATE OF CORRECTION

PATENT NO. : 4,861,048

DATED : August 29, 1989

INVENTOR(S) : Paul S. Slater

It is certified that error appears in the above-identified patent and that said Letters Patent is hereby corrected as shown below:

Abstract, line 6 "mwmber" should be --member--.

Col. 5, line 17 "an an" should be -- and an--.

Col. 5, line 63 "interval saround" should be --intervals around--.

Signed and Sealed this

Tenth Day of November, 1992

*Attest:*

DOUGLAS B. COMER

*Attesting Officer*     *Acting Commissioner of Patents and Trademarks*